United States Patent
Choi (10) Patent No.: US 10,193,782 B1
(45) Date of Patent: Jan. 29, 2019

(54) LAYER 4 SWITCHING FOR PERSISTENT CONNECTIONS

(71) Applicant: Akamai Technologies, Inc., Cambridge, MA (US)

(72) Inventor: Byung K. Choi, Boston, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 82 days.

(21) Appl. No.: 15/169,250

(22) Filed: May 31, 2016

Related U.S. Application Data (60) Provisional application No. 62/167,914, filed on May 29, 2015.

(51) Int. Cl.
  *G06F 15/173* (2006.01)
  *H04L 12/26* (2006.01)
  *H04L 29/08* (2006.01)
  *H04L 29/12* (2006.01)

(52) U.S. Cl.
  CPC ...... *H04L 43/0876* (2013.01); *H04L 61/1517* (2013.01); *H04L 69/326* (2013.01)

(58) Field of Classification Search
  CPC ............ H04Q 11/0478; H04Q 11/0071; H04L 2012/5652; H04L 2012/5672; H04L 69/16; H04L 41/0668; H04L 41/069; H04L 41/28; H04L 63/0428; H04L 63/104; H04L 69/03; H04L 69/326; H04L 69/40; H04L 43/16; H04L 67/1002; H04L 67/1008
  USPC .......................................................... 709/224
  See application file for complete search history.

(56) References Cited

U.S. PATENT DOCUMENTS

| | | | |
|---|---|---|---|
| 9,479,455 B2* | 10/2016 | Chrysos | H04L 49/101 |
| 2013/0170503 A1* | 7/2013 | Ooishi | H04L 45/38 370/401 |
| 2015/0029846 A1* | 1/2015 | Liou | H04L 47/122 370/230.1 |
| 2015/0295858 A1* | 10/2015 | Chrysos | H04L 49/101 370/412 |
| 2016/0173338 A1* | 6/2016 | Wolting | H04L 41/145 709/223 |
| 2016/0191386 A1* | 6/2016 | Swinkels | H04L 45/50 370/392 |

* cited by examiner

*Primary Examiner* — Frantz B Jean
(74) *Attorney, Agent, or Firm* — David H. Judson (57) ABSTRACT

This disclosure provides for a Layer 4 switching approach wherein a set of L4 switches are organized into a cluster so as to act as a single (or "big") Layer 4 switch. Connections between the L4 switches are carried out, e.g., using Layer 2 switches. To this end, an intra-cluster routing entity of the switch maintains mapping information (e.g., in a database, or set of data structures) about connections that have been established by the individual switches within the cluster. In this approach, each host (itself a switch) preferably acts like a group of ports of the larger (big) switch. This obviates having each member host from having to maintain connections to many possible destinations. Rather, the intra-cluster routing entity maintains the information about which hosts (and its ports) are connected to which destinations, and the connections are re-used as necessary, even if connections on one side of the "big" switch ceased being used.

14 Claims, 6 Drawing Sheets

LAYER 4 SWITCHING FOR PERSISTENT CONNECTIONS

BACKGROUND

Technical Field

This application relates generally to data packet switching.

Brief Description of the Related Art

Transport layer switches splice two OSI Layer 4 (L4) connections. Given two connection legs, Layer 4 switches typically terminate data flow of one leg first, and then forward in-sequence packets to the other leg. The isolation of packet loss in one leg from the other is an important factor in improving an overall end-to-end delivery performance because the recovery in one leg is usually quicker than otherwise in one longer connection. Multiplexed connections have multiple streams in such a connection. Layer 4 switches, without knowing the streams are multiplexed, do the same switching functions; they forward only in-sequence packets to the other leg. While it is believed that one single multiplexed connection generally shows improved performance over non-multiplexed multiple connections, one drawback of such multiplexed connections is reported higher sensitivity to packet loss. This is a form head of line blocking (HOL) at the connection level, where the data unit in problem blocks all other data units behind.

BRIEF SUMMARY

To address this and other problems associated with the prior art, this disclosure provides for a Layer 4 switching approach wherein a set of L4 switches are organized into a cluster so as to act as a single (or "big") Layer 4 switch. Connections between the L4 switches are carried out, e.g., using Layer 2 switches. To this end, an intra-cluster routing entity of the switch maintains mapping information (e.g., in a database, or set of data structures) about connections that have been established by the individual switches within the cluster. In this approach, each host (itself a switch) preferably acts like a group of ports of the larger (big) switch. This obviates having each member host from having to maintain connections to many possible destinations. Rather, the intra-cluster routing entity maintains the information about which hosts (and its ports) are connected to which destinations, and the connections are re-used as necessary, even if connections on one side of the "big" switch ceased being used.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

Figure 1:
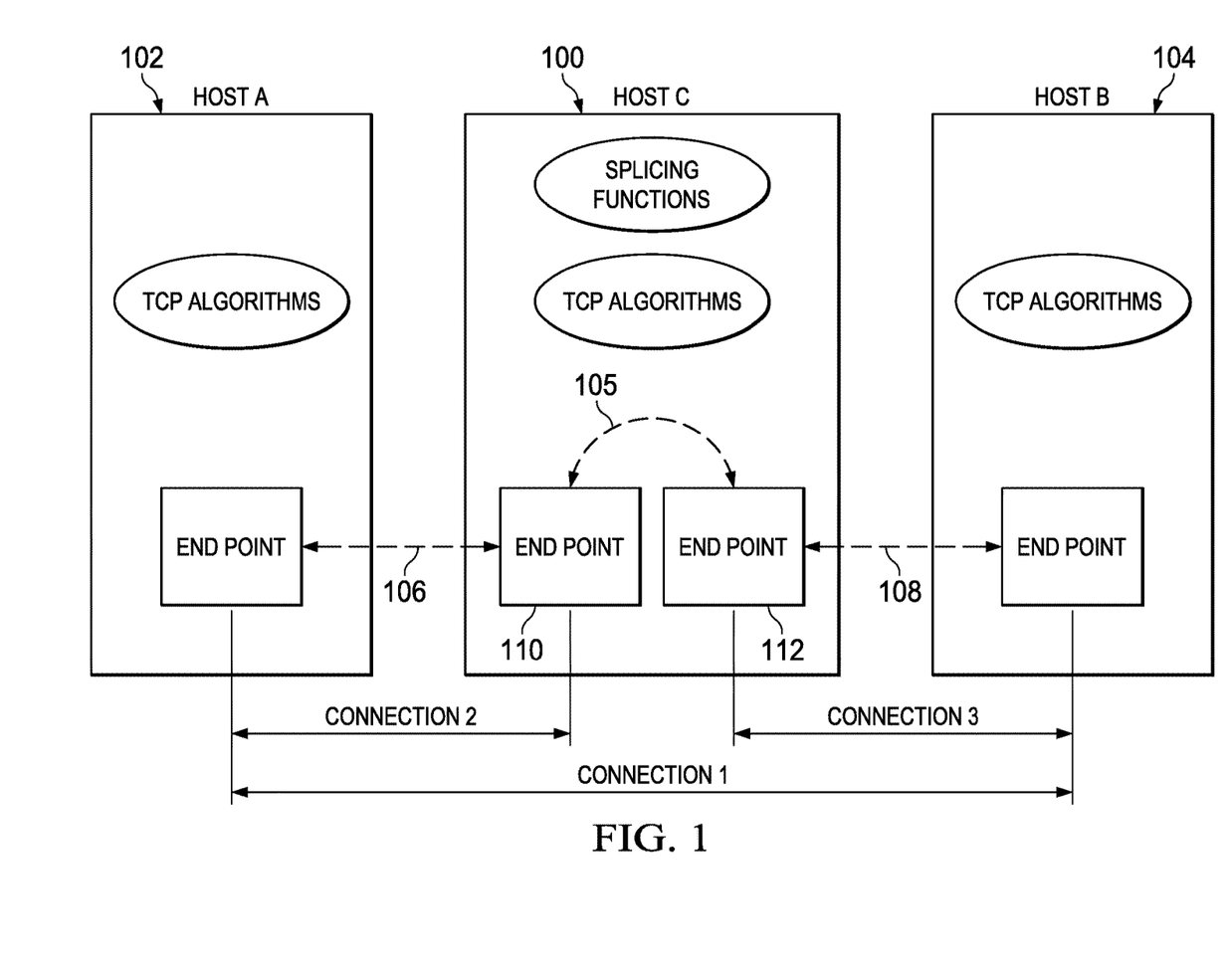
FIG. 1 is a block diagram of a known transport layer switch.
Figure 2:
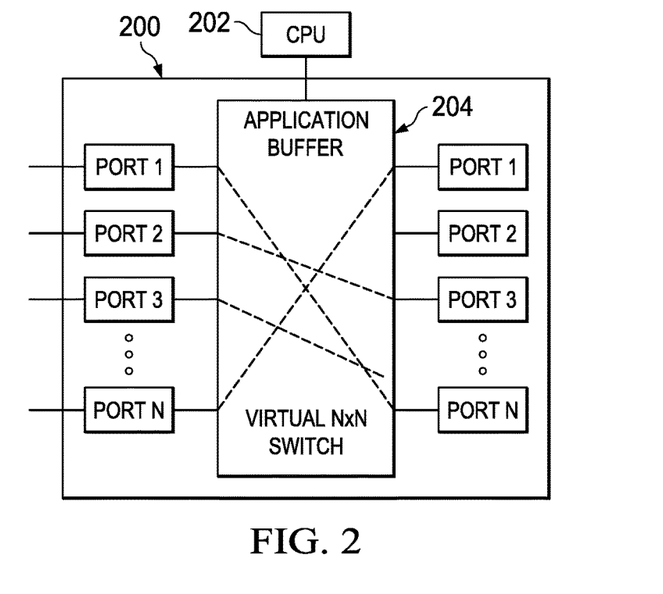
FIG. 2 depicts the transport layer switch in additional detail.

FIG. 1 depicts a model of the common implementation of a transport layer switch operating environment. In this drawing, Host C 100 is the switch between Host A 102 and B 104. More specifically, a splicing function in Host C is the switch between the two connections, one connection 106 between Host A and C, and another connection 108 between Host C and B. The splicing functionality 105 acts with respect to TCP end point 110 and 112 at Host C to seamlessly connect (splice) $TCP_{(a,c)}$ and $TCP_{(c,b)}$. The splicing functionality 105 transfers packets from one end point to another in the same host. Each packet flow, sometimes referred to as a connection segment, is terminated before being transferred to some other flow (connection). Host C is not necessarily just a single computing machine; indeed, the basic switching notion shown in FIG. 1 may be generalized as a distributed environment wherein an application layer overlay (comprising a large number of separate machines) on top of the Internet handles a massive number of TCP pairs. Thus, and with reference to FIG. 2, host C in FIG. 1 is depicted as a large-scale transport layer switch 200, effectively as an N×N switch, where N is the number of end points currently served. Here, the task of the switch is to transfer packets from one end point to another in the same single TCP pair as efficiently as possible. For Layer 3 routers and Layer 2 switches, the N×N switch typically is implemented in custom hardware in a form of ASIC (application-specific integrated circuit). In the L4 transport layer switch, however the processing unit 202 acts like a virtual switch fabric using an application layer buffer 204 as the switching device(s). In L4 switching, the packet switching is performed only between two end points (PORT in the figure) belonging to a same pair of TCP segments.

Regarding the common question on the motivation of having a switch between two connections, research has found that an intermediate node as a relay between the two connection segments, as illustrated as Host C in FIG. 1, actually can help achieve higher end-to-end performance. Although it might appear counter-intuitive with an additional host in between, the results are based on the high recovery cost of packet loss inherent to the reliable data transfer algorithms of TCP. In particular, the recovery cost on either one of segments (Connection 106 and Connection 108) is found lower than that on the end-to-end connection.

Note that the splicing functionality 105 (FIG. 1) transfers packets from one end point to another in the same host. Each packet flow, a connection segment, is terminated before being transferred to the other flow (connection).

By way of additional background, distributed Internet applications can be better optimized by combining persistent connections and Layer 4 switching together in place. For example, in FIG. 1, the communication between Host A and B is optimized first by having the Layer 4 switch in between, and secondly by having persistent connections, one between Host A and C, and another between Host C and B. Repeated data transfer between Host A and B preferably fully utilizes the persistent connections and Layer 4 switching avoids the overhead of destruction and construction of connections, and by minimizing the overhead of delivery guarantee.

One good example of the transport layer switch can be found in content distribution networks (CDN) on a global scale. The fundamental approach for building the largest such networks is to use an overlay on top of the Internet. Technically, this means that the transport layer switch (e.g., Host C in FIG. 1) is required to handle a massive number of TCP pairs. This requirement creates an interesting engineering challenge as modeled in FIG. 2. The figure portrays Host C in FIG. 1 as a large scale transport layer switch, effectively an N×N switch, where N is the number of end points currently served. In this case, the task of the switch is to transfer packets from one end point to another in the same single TCP pair as efficiently as possible. For Layer 3 and Layer 2 switches, the N×N switch fabric is normally implemented in custom hardware in a form of ASIC (application specific integrated circuit). In the transport layer switch, however, and as noted above, the CPU acts like a virtual switch fabric using the application layer buffer as the switching devices.

Figure 3:
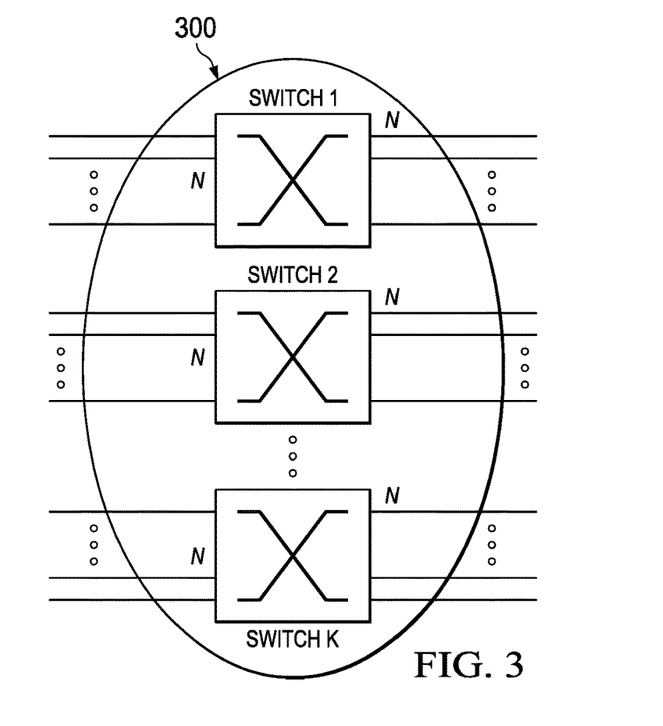
FIG. 3 illustrates a Layer 4 switch cluster for handling a large number of connections.

In case where N is not large enough to accommodate the desired number of connections, and where N is the maximum number of connections a host can support, there are generally two architectural choices to handle the situation. One is to use a larger capacity host, which would quickly become expensive, as typically that approach could not be implemented in a commodity-based manner. The other is to use multiple hosts, which is much more practical. To that end, FIG. 3 illustrates the notion of a Layer 4 switch cluster 300 as a practical approach for handling a massive number of connections. For simplicity, the switching capacity of each host is assumed N. As can be seen, K machines of N capacity will collectively make K×N cluster switching capacity.

Figure 4:
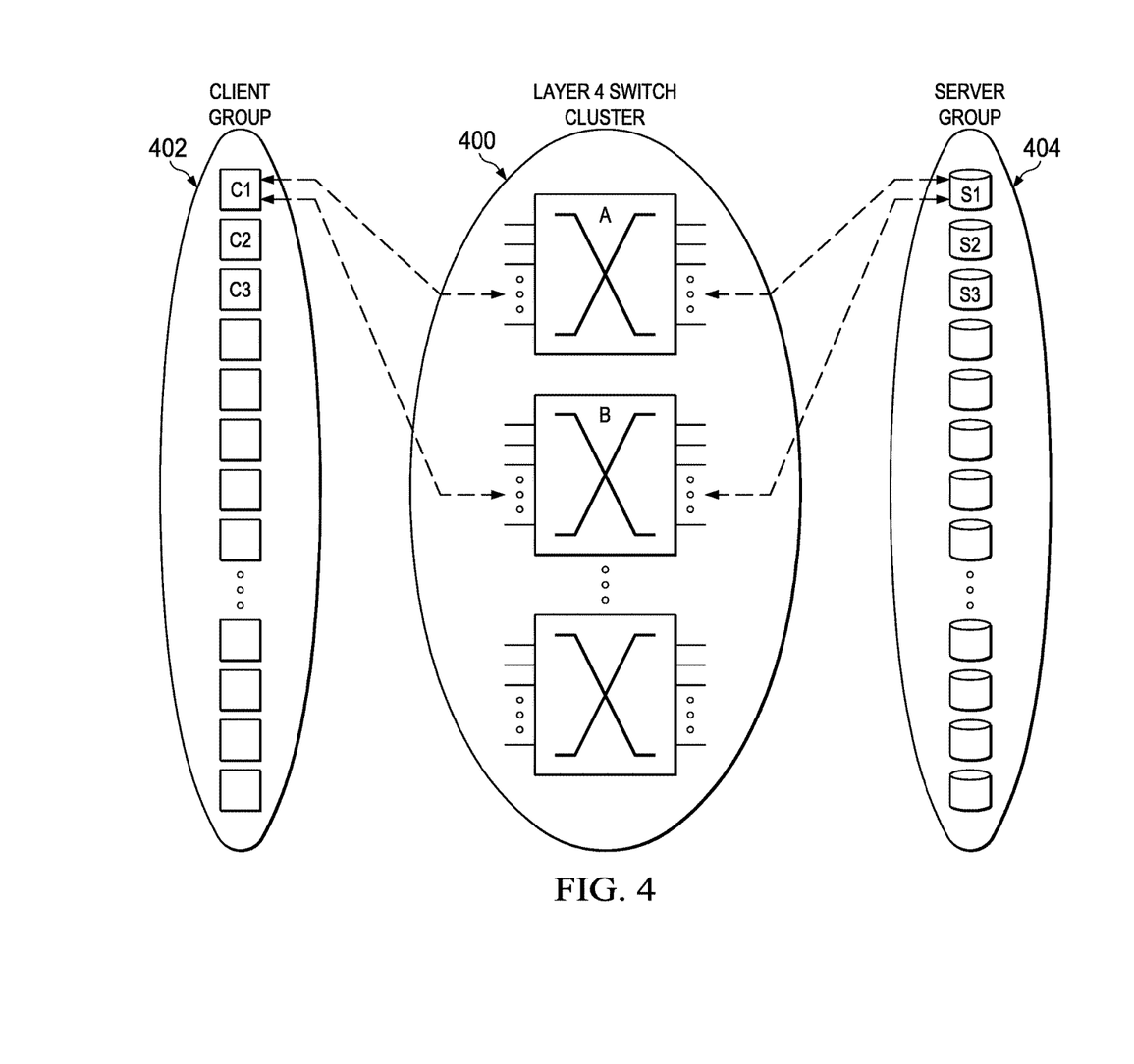
FIG. 4 depicts a situation wherein there are a large group of client, a large group of servers, and a cluster of switches in-between, showing a relationship of the groups in light of persistent connections.

FIG. 4 depicts a switch cluster implementation where there are a large group of clients 402, a large group of servers 404, and a cluster of switches 400 in between. While FIG. 3 shows just the switch cluster, FIG. 4 illustrates the relationship of the groups in light of the connections, which preferably are persistent connections. The model of the switch cluster in FIG. 4 herein is sometimes referred to as Coexisting. This Coexisting model is not necessarily efficient in terms—of persistent connection availability. In this model, the connection in the right hand side (between the switch cluster and server group) is tied up with the individual switch, where the connection is terminated. This binding does not allow other connections in the left-hand side (between the client group and switch cluster) to utilize the right hand side connection unless both connections are terminated in the same individual switch. An example follows.

Assume a client C1 connects with a server S1 through a switch A. After a short while, the client C1 goes offline. The client status change destroys the connection between the client and the switch (C1 and A). The connection between the switch and the server (A and S1), however, still remains alive with the expectation that this connection will be used for other data transactions sooner or later. Sometime later, the client C1 comes back online to the server S1. The connection from the client to the cluster, however, happens to another switch B this time. To make matters worse, for the moment, assume that the switch B does not have a connection to the server S1. The consequence is that, even though there is an existing connection to the server S1 from the switch A of the same cluster, a new connection has to be established between the switch B and server S1. The problem here is that, in this example, the client C1 has no benefit to utilize existing persistent connections. This problem happens because of the binding of individual switch and connection. While the cluster switching capacity is linearly growing with more individual switches, the persistent connection availability is still tied up with one single individual switch.

Figure 5:
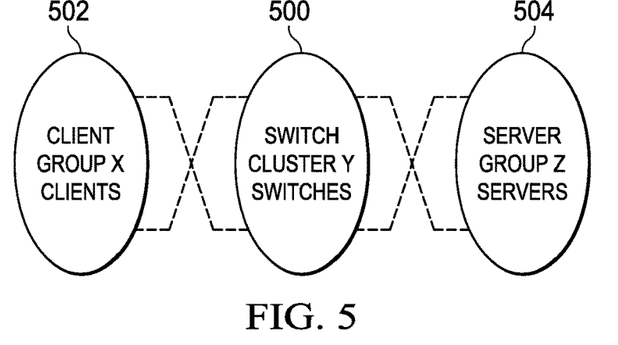
FIG. 5 depicts a model of a switch cluster in a web access environment wherein different groups are defined.

FIG. 5 shows an organic model of switch cluster in a web access scenario where three different groups are defined; the client group 502 of size X, the server group 504 of size Z, and finally the switch group 500 of size Y. There are two types of connections; one between a member of X and a member of Y, $C(X_i,Y_j)$, and another between a member of Y and a member of Z, $C(Y_j, Z_k)$, where i, j, and k are a unique member of the respective group. The lifetime of $C(X_i,Y_j)$ is subject to the user agent's policy at the client side. The switch does not initiate the termination of $C(X_i,Y_j)$. The maximum lifetime of $C(X_i,Y_j)$ is from the time the client comes online to the time of the client's explicit action for termination, including going offline, turning off the browser, etc. The lifetime of $C(Y_j,Z_k)$ is subject to the server policy at the server side. The switch keeps $C(Y_j,Z_k)$ alive as long as the server policy allows. The maximum lifetime of $C(Y_j,Z_k)$ is the maximum time the server allows. The effective minimum time $T_{min}$, that the client has to spend to establish a connection to the intended server is therefore the time needed to establish a $C(X_i,Y_j)$ when the client comes online first. The goal of the organic model is to guarantee $T_{min}$ for all online activities with some server by each client $X_i$. The maximum number of connections that the client group could create as a whole to the switch cluster is defined as $C_{max}(X,Y)$ Likewise, the number of connections that the server group would need to serve the online activities created from $C_{max}(X,Y)$ is defined as $C_{max}(Y,Z)$. In this organic model, the number of connections the switch cluster maintains from itself to the server group is limited only to:

$$C_{max}(X,Y).$$

Note, for comparison, that in the coexisting model shown in FIG. 4, this number is upper bounded by:

$$C_{max}(Y,Z) \times Y$$

to guarantee $T_{min}$ for all online activities by each and every client $X_i$. Most importantly, the organic model allows that the number of persistent connections supporting $T_{min}$ is proportional to the size of the switch cluster Y. In contrast, in the coexisting model (FIG. 4), the scope of such persistent connections is bound to one single switch capacity regardless of the cluster size.

Layer 4 Switch for Persistent Connections

Figure 6:
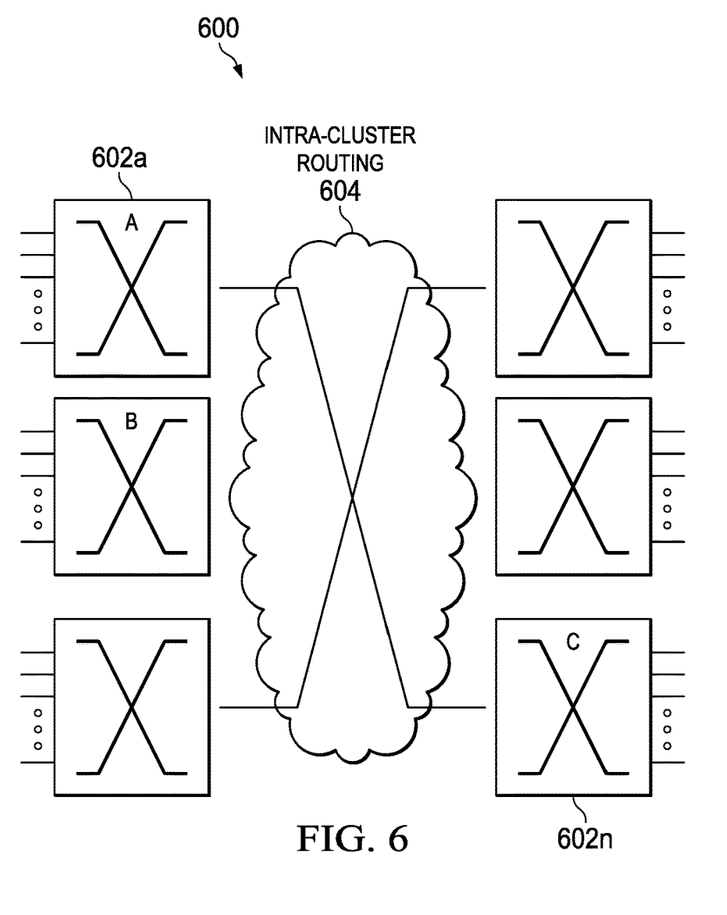
FIG. 6 depicts the technique of this disclosure wherein a collection of switches acts as a large scale Layer 4 switch.

FIG. 6 shows the concept of a big Layer 4 switch ("BigL4") according to this disclosure. The switch 600 comprises a collection of switches 602a-n that act as one big Layer 4 switch. The operation of the switch 600 is straightforward. Assume a $C(X_i,Y_j)$ is created at switch A with some intended server. By consulting an intra-cluster routing entity 604, switch A learns that a $C(Y_j,Z_k)$ is available at switch C. The routing entity can find the available connection by using the information of intended server by the client. Note that the switch A does not have to have a connection to the intended server by the client. The existing connection maintained by switch C is utilized by switch A. After some while, the $C(X_i,Y_j)$ is destroyed by the client. However, the connection $C(Y_j,Z_k)$ still remains alive as long as the server policy allows. Another connection $C(X_i,Y_j)$ is created now at switch B. The switch B again repeats the same intra-cluster routing process. So the goal of $T_{min}$ is achieved again for the $C(X_i,Y_j)$.

The intra-cluster routing is a new functional entity used in the switch 600. It maintains mapping information between the switch and available connection from the switch to some servers. Other attributes of the connection can include current status, i.e., actively used or idle, values of TCP parameters, current buffer size, etc. The indexing of the information record can be done in many different ways. One straightforward approach is to use the IP address of the server. Another example is to use the URL (universal resource locator) of the HTTP request/response message for web access applications. The intra-cluster routing entity can be centralized at one physical device, switch or a separate (virtual) appliance, or it may be distributed to the switches in the cluster.

The allocation of connections between the switch and server groups may be implemented in one of several ways. If the system runs in a first-come and first-served basis (FIFO), it is likely that some switches are highly loaded while others are idle. Allocating the same number of connections to each switch would not solve this load balancing problem because different connections will handle different end user behaviors and web services. One generic solution is to equip the intra-cluster routing with the traffic load information dynamically so that the routing entity can choose a switch that not only has an idle connection to the server but also more CPU cycles to take more traffic.

The intra-cluster switching from one Layer 4 switch to another, say, from Switch A to Switch C in the switch 600 in FIG. 6, for example, may be implemented by a commercial Layer 2 switch. If one Layer 2 switch's capacity is not big enough for the cluster size, multiple Layer 2 switches can be used to comprise the Layer 6 switch of this disclosure. In a rare case for an enormous number of persistent connections, and where a large number of Layer 2 switches are required to support a very large Layer 6 switch, advanced Layer 2 networking technologies can be introduced.

The approach is advantageous as the capacity grows linearly for even massive persistent connections. The capacity typically is proportional to the number of individual Layer 2 switches in the cluster. The switch maintains a minimum number of persistent connections to a destination, which then maximizes the utilization of existing persistent connection. The performance gain is obtained by leveraging the notion that, with respect to a given destination, the switch preferably uses an existing persistent connection from some switch in the cluster to that destination. Practically, however, having only one connection to a destination may risk creating the head of line blocking problem (HOL) described above, a classical issue in networking. This problem can happen in a general situation, where multiple traffic flows are heading for one single destination. The net effect is that only one flow or packet at a time can reach the destination while the rest is waiting for a turn. In the switch of this disclosure, it is because any connection from the left side of FIG. 6 can try to use any connection from the right side. To mitigate the HOL problem, preferably some multiple connections to a given destination should exist in the cluster.

Figure 7:
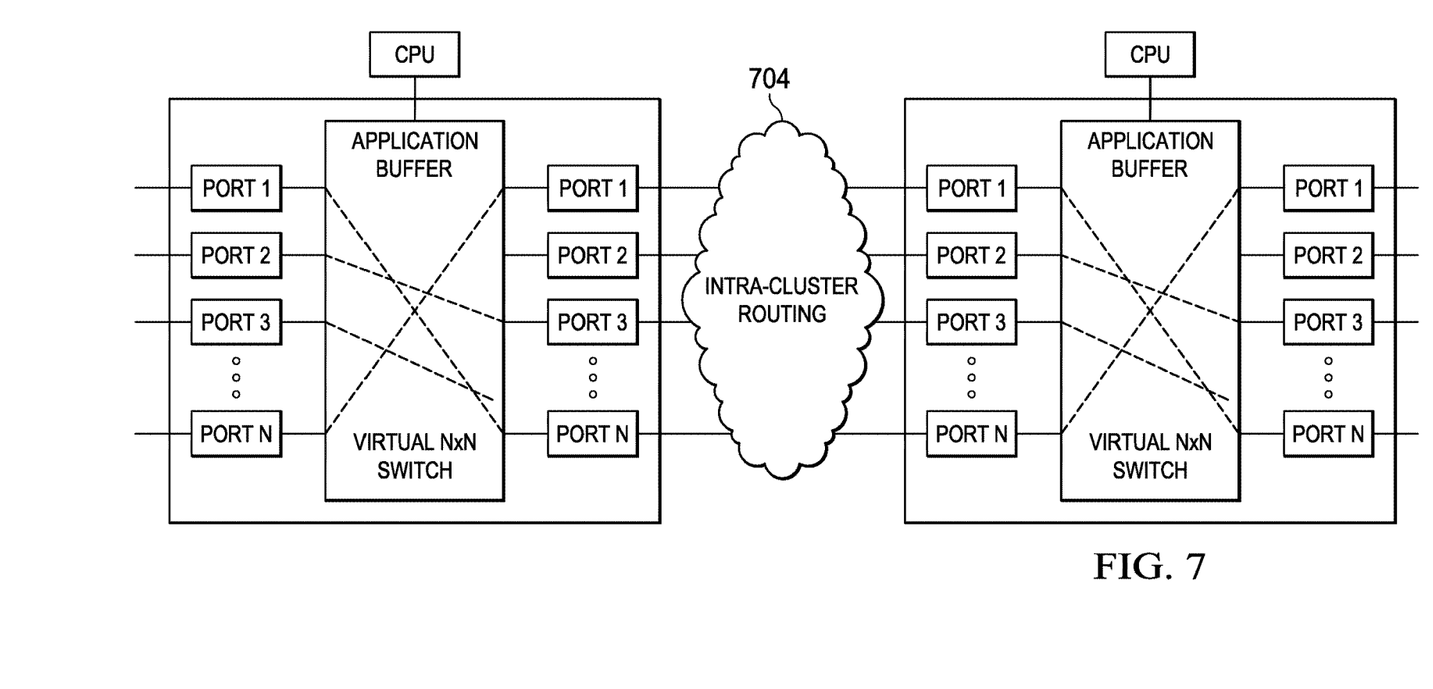
FIG. 7 depicts an endpoint for support of the Layer 4 switching of this disclosure.

There can be various ways to implement the endpoint in support for the switch. FIG. 7 shows one approach without a modification to the current popular scheme of endpoint management. In this approach, the intra-cluster routing entity 704 is the only addition to the Coexisting model. The overhead of creation and destruction of exclusively reserved endpoints in the straightforward approach can be mitigated by using an endpoint pooling scheme. One advanced method of endpoint management with statistical multiplexing can also support the switch in a more efficient way in terms of space utilization.

The intra-cluster routing entity can have or access more information on the load conditions of the individual switch including, for example, current CPU load, current memory load, current disk load, etc., in addition to the set of information about connections. Then the final decision on connection allocation will be based on not only the availability of the connection but also the general computation load of the individual switch.

Content delivery networks (CDNs) typically have a large number of overlay nodes. Many nodes act like a Layer 4 switch is that they are neither an originator nor a terminator of Layer 4 connections. Upon this platform a large number of persistent connections may be carefully maintained in an effort to avoid the time overhead required to establish a new connection for each new web access.

Figure 8:
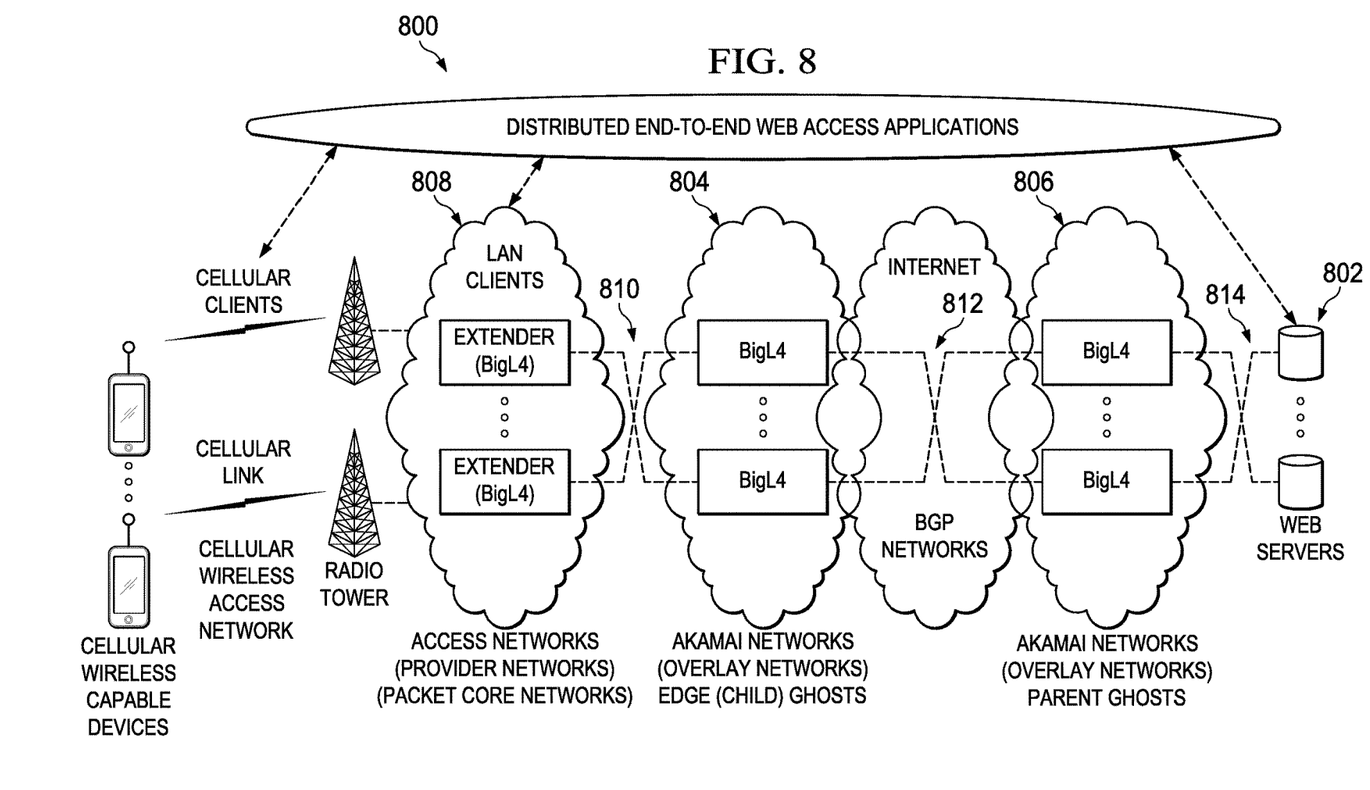
FIG. 8 depicts how L4 switches as implemented herein may be used in an operating environment wherein a cellular wireless link is coupled to an Internet-based distributed delivery network, such as a content delivery network (CDN).

FIG. 8 shows networks with end user clients 800 and web servers 802, where both cellular wireless-based and LAN-based clients access the web servers via the CDN infrastructure, which includes edge (child) nodes 804, and parent nodes 806. The CDN may also include an "extender" cluster of machines or processes 808 that are positioned with a provider's packet core network. The extender is an IP-addressable compute cluster inside provider access networks, where it mostly acts like a transparent proxy. As seen in the drawing, each network interface is identified as a location where the technique of this disclosure thus may be used in terms of persistent connection availability and utilization of persistent connections. First, the interface 810 between the access and CDN child edge networks can be designed with the switch herein between the extender cluster and the CDN child edge clusters. Second, the interface 812 between CDN edge and parent networks, although it is logical, can also adopt the switching approach herein as a new way for persistent connection management. Finally, the interface 814 between the CDN parent network and web server (or, more generally, an origin server tier) can be extended with the switching approach herein so that any parent cluster can maintain connections to all web servers. With the inter-cluster routing built into one or more of these interfaces, the unavailability of persistent connections between the extender and origin server will be close to non-existent. In case of cellular wireless clients, this means that the connection establishment overhead will only be required between the end user device and extender. The rest will effectively be always on. The approach is straightforward to implement in CDNs that use Layer 2 commercial switches (e.g., for internal back-end networks or otherwise to support machine-to-machine communications).

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

Preferably, the functionality is implemented in an operating system and/or application layer solution, although this is not a limitation.

There is no limitation on the type of computing entity that may implement the connection control functionality of this disclosure. Any computing entity (system, machine, device, program, process, utility, or the like) may provide this operation.

As noted above, the techniques herein may be implemented to facilitate content delivery over a mobile network.

What is claimed is as follows:

1. A method of improving operations of an overlay network using transport layer (Layer 4) switching, the overlay network comprising a plurality of overlay nodes organized as edge nodes, parent nodes and other Internet Protocol (IP)-addressable nodes, the overlay network nodes being positioned between requesting client devices and content provider origin servers that utilize the overlay network nodes to thereby provide content and application delivery to the requesting client devices, comprising:
    organizing a set of switches into an interface, wherein each switch in the set of switches provides a group of ports that are dedicated to providing out-bound connections to given destinations persistently;
    selectively positioning the interface between one of: the IP-addressable nodes and edge nodes, the edge nodes and the parent nodes, and the parent nodes and the content provider origin servers; and
    controlling routing across the interface such that, as requesting client devices interact with content provider origin servers, a given persistent connection to a destination in a particular switch is used by first and second in-bound connections;
    wherein providing the interface with out-bound persistent connections improves overlay network performance by reducing connection establishment overhead with respect to communications between the requesting client devices and content provider origin servers that traverse the overlay network.

2. The method as described in claim 1 wherein the in-bound connections also are persistent connections.

3. The method as described in claim 1 further including interconnecting first and second of the switches in the interface with a Layer 2 switch.

4. The method as described in claim 1 wherein IP-addressable nodes comprise a node cluster positioned within a wired core network.

5. The method as described in claim 1 wherein the interface has a capacity that is proportional to a number of individual switches in the interface.

6. The method as described in claim 1 wherein the client device is a mobile device.

7. A method of improving operations of an overlay network using transport layer (Layer 4) switching, the overlay network comprising a plurality of overlay nodes organized as edge nodes and parent nodes, the overlay network nodes being positioned between requesting client devices and content provider origin servers that utilize the overlay network nodes to thereby provide content and application delivery to the requesting client devices, comprising:
    organizing a set of switches into an interface, wherein each switch in the set of switches provides a group of ports that are dedicated to providing out-bound connections to given destinations persistently;
    selectively positioning at least (a) a first interface between the IP-addressable nodes and the edge nodes, and (b) a second interface between the edge nodes and the parent nodes; and
    controlling routing across the first and second interfaces such that, as requesting client devices interact with content provider origin servers, a given persistent connection to a destination in a particular switch is used by first and second in-bound connections;
    wherein providing the first and second interfaces each of which having out-bound persistent connections improves overlay network performance by reducing connection establishment overhead with respect to communications between the requesting client devices and content provider origin servers that traverse the overlay network.

8. The method as described in claim 7 wherein the in-bound connections are also persistent connections.

9. The method as described in claim 7 further including interconnecting first and second switches in at least one of the first and second interfaces with a Layer 2 switch.

10. The method as described in claim 7 wherein at least one of the first and second interfaces has a capacity that is proportional to a number of individual switches therein.

11. The method as described in claim 7 further including Layer 2 switching the first and second in-bound connections across each of the first and second interfaces.

12. The method as described in claim 7 further including positioning a third interface between requesting client devices and the edge nodes of the overlay network.

13. The method as described in claim 12 wherein the third interface is positioned within a wired core network.

14. The method as described in claim 7 wherein the client device is a mobile device.

\* \* \* \* \*